United States Patent
Flores et al.

(10) Patent No.: US 11,772,711 B2
(45) Date of Patent: Oct. 3, 2023

(54) FENDER SUPPORT ARM WITH BOLT-RETAINING STRIP

(71) Applicant: Fontaine Spray Suppression Company, Springfield, TN (US)

(72) Inventors: Helbert Flores, Goodlettsville, TN (US); Rick Buckelew, Hendersonville, TN (US); Kyle Denu, Gallatin, TN (US)

(73) Assignee: Fontaine Spray Suppression Company, Springfield, TN (US)

( * ) Notice: Subject to any disclaimer, the term of this patent is extended or adjusted under 35 U.S.C. 154(b) by 237 days.

(21) Appl. No.: 17/390,221

(22) Filed: Jul. 30, 2021

(65) Prior Publication Data
US 2022/0041224 A1    Feb. 10, 2022

Related U.S. Application Data (60) Provisional application No. 63/062,626, filed on Aug. 7, 2020.

(51) Int. Cl.
*B62D 25/16* (2006.01)
*F16B 5/02* (2006.01)

(52) U.S. Cl.
CPC ............. *B62D 25/166* (2013.01); *F16B 5/02* (2013.01)

(58) Field of Classification Search
CPC .. B62D 25/161; B62D 25/163; B62D 25/165; B62D 25/166
See application file for complete search history.

(56) References Cited

U.S. PATENT DOCUMENTS

| 3,684,312 | A | 8/1972 | Evans |
| 4,377,294 | A | 3/1983 | Lockwood et al. |
| 6,186,527 | B1 * | 2/2001 | Monhollen ........ B62D 25/188 280/154 |
| 6,886,862 | B2 | 5/2005 | Matthew |
| 7,235,744 | B2 | 6/2007 | Zoller |

(Continued)

FOREIGN PATENT DOCUMENTS

DE    102010038423 B4    5/2019

OTHER PUBLICATIONS

Trux Accessories, Tube Assembly used by Trux Accessories, admitted prior art, date unknown.

(Continued)

*Primary Examiner* — Brian L Swenson
(74) *Attorney, Agent, or Firm* — ANDRUS INTELLECTUAL PROPERTY LAW, LLP (57) ABSTRACT

A bolt-retaining strip for a fender support arm may include a base with a first surface configured to be seated against an elongated support member, a second surface opposite the first surface, and a hole dimensioned to receive a shank of a bolt extending from the first surface to the second surface. A first arm and a second arm extending from the second surface may be positioned on opposite lateral sides of the hole so that the head of the bolt can be received therebetween. A lip may extend from a respective interior surface of each of the first and second arms towards the opposite arm and can be dimensioned to extend over a portion of the head of the bolt. A flange may be positioned proximate each of the first and second arms and can be configured to restrict rotation of the bolt relative to the hole.

20 Claims, 7 Drawing Sheets

(56) References Cited

U.S. PATENT DOCUMENTS

| | | |
|---|---|---|
| 7,874,592 B2 | 1/2011 | Eklund et al. |
| 2002/0085896 A1 | 7/2002 | Werner et al. |
| 2005/0201846 A1* | 9/2005 | Santamaria ............ F16B 5/0241 |
| | | 411/108 |
| 2013/0193300 A1* | 8/2013 | Eklund ................. B62D 25/163 |
| | | 248/610 |
| 2014/0367997 A1* | 12/2014 | Yamanaka ............. B62D 25/16 |
| | | 296/191 |
| 2016/0001820 A1* | 1/2016 | Schmeichel ........... B62D 25/18 |
| | | 280/851 |
| 2016/0001821 A1* | 1/2016 | Denu ................... B62D 25/166 |
| | | 280/154 |
| 2016/0121812 A1* | 5/2016 | Avalos Sartorio ... B62D 27/065 |
| | | 29/464 |
| 2019/0078596 A1* | 3/2019 | Yoyasu ..................... F16B 2/22 |

OTHER PUBLICATIONS

Bettshd Truck Parts, Strip Assembly used by BettsHD Truck Parts, admitted prior art, date unknown.

Fontaine Spray Suppression Company, Welded Strip Assembly used by Fontaine Spray Suppression Company, admitted prior art, 2016.

* cited by examiner

FENDER SUPPORT ARM WITH BOLT-RETAINING STRIP

CROSS-REFERENCE TO RELATED APPLICATION

The present application claims the benefit of U.S. Provisional Patent Application No. 63/062,626, filed on Aug. 7, 2020, the content of which is hereby incorporated by reference in its entirety.

FIELD

The present disclosure relates generally to accessories for vehicles such as semi-tractors, and more specifically to an arm for supporting a fender on a semi-tractor.

BACKGROUND

U.S. Pat. No. 4,377,294 discloses a fender and support bar for automotive vehicle wheel sets. The fender comprises a panel having a support seat formed thereon intermediate its longitudinal ends and the support comprises an elongated tube which is rigidly connected to the panel. The rigid mechanical connection is provided by pairs of clamping plates disposed at opposite sides of an inner wall of the support bar and a wheel set facing surface of the fender panel. A plurality of clamping bolts are positioned along the elongated clamping plates and the heads of these bolts are secured to that clamping plate inserted within the interior of the tube to facilitate assembly. Mounting of the support bar in supported relationship to a vehicle chassis is by a telescopic sleeve assembly utilizing compression clamps to obtain a fixed position connection.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A bolt-retaining strip for a fender support arm may include a base having a first side configured to be seated against a surface of an elongated support member of the fender support arm. A pair of arms may extend from an opposite second side of the base and may be configured to allow a head of a bolt to pass therebetween. The base may comprise a hole passing therethrough, which is configured to receive a shank of the bolt. Each arm in the pair of arms may have a lip on a surface of the arm that faces toward the opposite arm, and each lip may be configured to extend at least partially over the head of the bolt when the bolt is fully inserted into the hole in the base. Each arm in the pair of arms may have a flange located on or inwardly of the surface of the arm that faces toward the opposite arm, the flange being located between the base and the lip and configured to contact the head of the bolt to prevent rotation thereof with respect to the hole in the base.

A bolt-retaining strip for a fender support arm may include a base including a first surface configured to be seated against a surface of an elongated support member of the fender support arm and a second surface opposite the first surface. A hole may extend from the first surface of the base to the second surface, and the hole may be dimensioned to receive a shank of a bolt. A first arm and a second arm may be positioned on opposite lateral sides of the hole and may project outward from the second surface of the base. The first and second arms may be spaced apart so that a head of the bolt can be received between the first arm and the second arm. A lip may extend from a respective interior surface of each of the first and second arms towards the opposite one of the first and second arms, and each of the lips may be dimensioned to extend over a portion of the head of the bolt. In some embodiments, the lips of the arms may be configured to extend over the head of the bolt to restrict movement of the bolt relative to the base of the bolt-retaining strip. A flange may extend upwards from the second surface proximate each of the first arm and the second arm, respectively, and each of the flanges may be configured to restrict rotation of the bolt relative to the hole.

In some embodiments of a bolt-retaining strip, the base may be elongated in a longitudinal direction, and the base may include additional holes passing therethrough, the holes being spaced in the longitudinal direction. Further, the bolt-retaining strip may include grooves formed in the second surface of the base proximate the flanges, and the grooves may extend along the base in the longitudinal direction.

In some embodiments of a bolt-retaining strip, each of the flanges may be integrally formed in the interior surface of the first arm or the second arm. The arms my further include an indentation formed in the interior surface of each of the first arm and the second arm between the respective lip and flange. Additionally or alternatively, some embodiments of a bolt-retaining strip may include exterior flanges extending laterally outward from opposite sides of the base. Each of the exterior flanges may be integrally formed with one of the first or second arms and extends upward from the second surface of the base. Further still, the first arm and the second arm each may include a tapered surface that tapers laterally inward from a distal end of the respective first or second arm to the lip thereof. In some embodiments of a bolt-retaining strip, the first surface of the base may be curved in a convex arc between opposite lateral sides of the base. The surface of the elongated support member may be curved in a concave arc such that the first surface of the base is configured to be nested within the concave arc, and the convex arc of the base can have a first radius that is larger than a second radius of the concave arc of the elongated support member.

A fender support arm configured for securing a fender to a truck may include an elongated support member and a bolt retaining strip configured to be received within the elongated support member. The elongated support member may include a passageway extending from a first end to a second end, and the passageway may be configured to engage a mounting feature positioned on the truck to secure the elongated support member to the truck. The bolt-retaining strip may include a base with a first side configured to be seated against an interior surface of the elongated support member and a pair of arms extending from an opposite second side of the base. The arms may be configured to allow a head of a bolt to pass therebetween and each arm in the pair of arms may include a lip and a flange. The lips may extend inward towards the opposite one of the arms and can be configured to retain the head of the bolt between the pair of arms, and the flanges may be configured to contact the head of the bolt to prevent rotation thereof. The base of the bolt-retaining strip and the elongated support member may each include a hole configured to receive a shank of the bolt such that the shank extends through the base and the elongated support member to engage an opening on the fender to secure the fender to the truck.

In some embodiments of a fender support arm, the elongated support member may be configured to be received in a mounting cradle on the fender. The bolt-retaining strip may be elongated in a longitudinal direction, and the base can further include additional holes passing therethrough. The holes may be spaced in the longitudinal direction and configured to align with corresponding holes in the elongated support member and corresponding openings on the fender.

In some embodiments of a fender support arm, the bolt-retaining strip may include a pair of grooves formed in the second side of the base. Each of the grooves may be positioned between one of the arms and the hole formed through the base and can be configured to allow the base of the bolt-retaining strip to flex so that the first side thereof conforms to the interior surface of the elongated support member. In such an embodiment, the grooves may be configured to allow the bolt-retaining strip to flex such that the each of the arms pivots outward to allow the head of the bolt to travel past the lips.

In some embodiments of a fender support arm, the pair of arms may be configured to flex outward as the bolt is received therebetween so that the head of the bolt can travel past the lips. Further, each arm in the pair of arms may include a tapered leading surface positioned between the lips and distal ends of the arms, and each of the tapered leading surfaces may be configured to abut the head of the bolt as it travels towards the base to push the pair of arms outward.

BRIEF DESCRIPTION OF DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral," or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second," "third," etc. is not intended to connote priority or importance, but merely to distinguish one of several similar elements from another.

Figure 1:
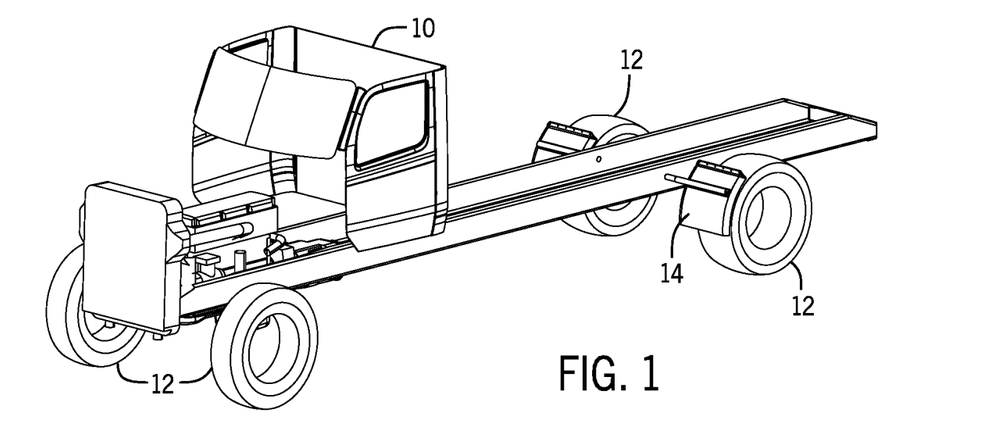
FIG. 1 illustrates a truck with a fender held by a support arm.
Figure 2:
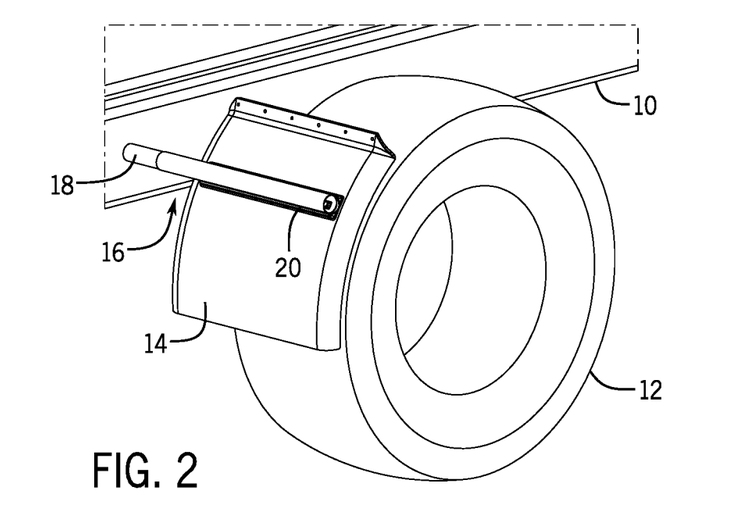
FIG. 2 illustrates a detailed view of the fender and support arm of FIG. 1.

FIG. 1 illustrates a truck 10 with four tires 12. A fender 14 is shown over one of the tires 12. Although the fender 14 shown herein is typically referred to as a "quarter fender," due to the extent to which it covers the tire 12, the present disclosure is equally applicable to other types of fenders, such as, but not limited to, single-axle fenders, half tandem fenders, or full tandem fenders. As shown in FIG. 2, the fender 14 may be supported on the truck 10 by a fender support arm 16. The fender support arm 16 is shown extending perpendicularly out from the side of the truck's chassis but could extend from another part of the truck 10 instead. The fender support arm 16 may also extend from the side of the truck's chassis at a different angle. The fender support arm 16 may include a mounting feature configured as a mounting post 18 and an elongated support member 20 configured to connect to the mounting post 18. The mounting post 18 can be connected to the truck 10 by way of a bracket (not shown) and fasteners such as bolts. Additionally or alternatively, some embodiments may include a mounting feature that is secured to a truck by a different type of mechanical fastener, welds, adhesives, and/or using any other method for attachment.

Figure 3:
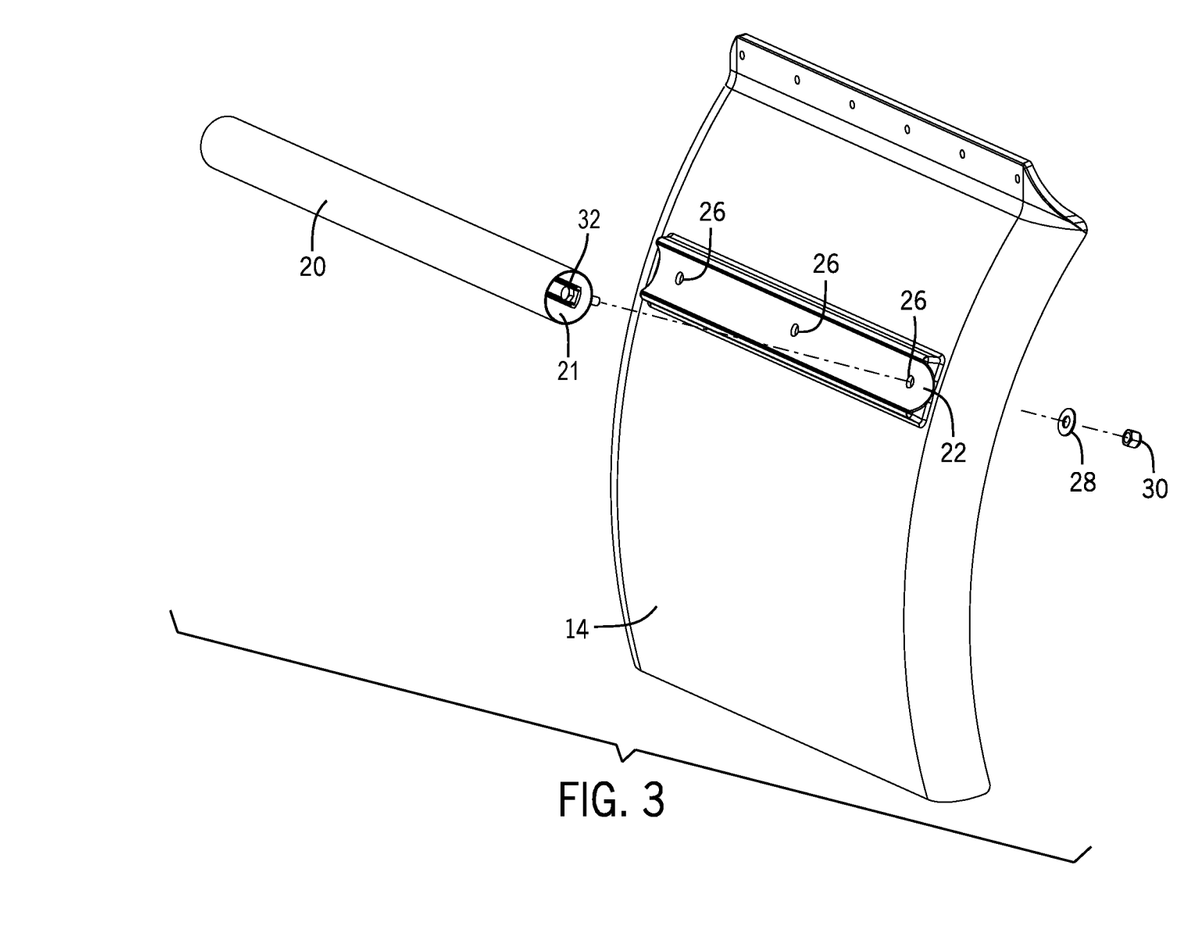
FIG. 3 illustrates a partially exploded view of the fender and fender support arm.
Figure 4:
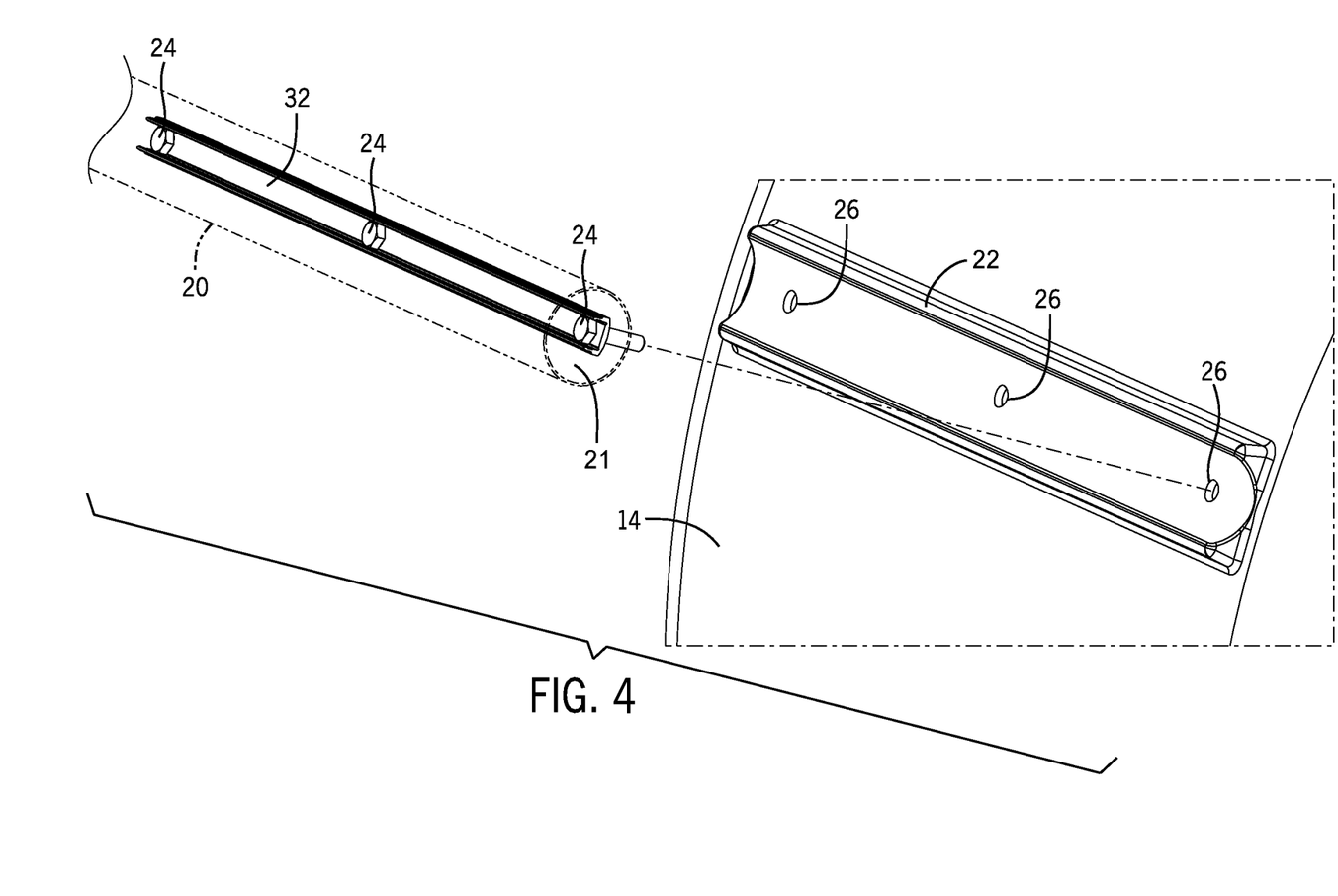
FIG. 4 illustrates a close-up view of a portion of FIG. 3.

FIGS. 3 and 4 show the fender 14 and a portion of the fender support arm 16, specifically, the support member 20, in a partially exploded view. The support member 20 may be sized and shaped to fit into a mounting cradle 22 formed in or attached to the front surface of the fender 14. A passageway 21 extends through the hollow tubular body of the support member 20 between a first end and a second end thereof. The support member 20 is connected to the fender 14 by way of bolts 24 extending through holes 25 (see, e.g., FIG. 12) or slots in the side of the support member 20 that is seated in the cradle 22, which also has holes 26 for receiving the bolts 24. The bolts 24 secure the support member 20 to the fender 14 within the cradle 22 upon tightening of washers 28 and nuts 30 on the shanks 60 (see FIGS. 7, 8, 12) of the bolts 24 that extend through to the opposite side of the fender 14. Once the support member 20 is secured to the fender 14, the support member 20 can be slid over the free end of the mounting post 18 to attach the support member 20 and fender 14 connected thereto to the truck 10. In the present example, the support member 20 and mounting post 18 are cylindrical, but other tubular shapes could be used.

For aesthetic, strength, and/or wear purposes, the heads of bolts 24 may be located within the passageway 21 of the hollow tubular body of the support member 20, which is shown in phantom in FIG. 4 in order that the heads of bolts 24 can be seen. Because of such location, however, it is nearly impossible for a tool to reach the heads of the bolts 24, especially the bolt 24 located furthest from the ends of the support member 20, in order to prevent the bolts 24 from turning while the nuts 30 are tightened. Some prior designs spot-welded the heads of the bolts to a retaining strip located in the support member 20, in order to keep the bolts from turning. However, such an arrangement is not desirable for shipping to a customer for self-assembly. Therefore, through research and development, the present inventors developed a bolt-retaining strip 32 for the fender support arm 16 that prevents the bolts 24 from turning while the nuts 30 are tightened, as is described below.

Figure 5:
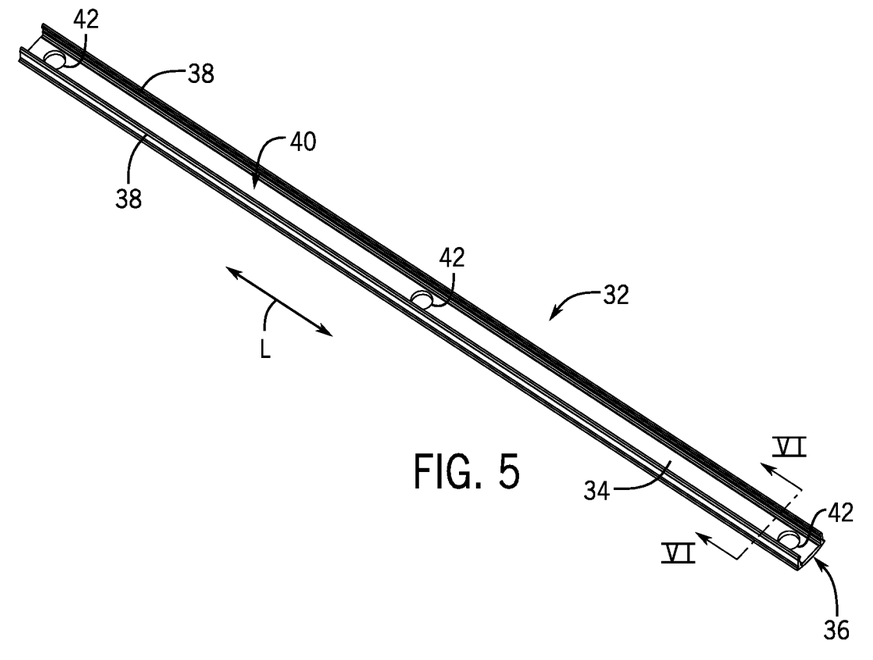
FIG. 5 illustrates a bolt-retaining strip for the fender support arm.
Figure 6:
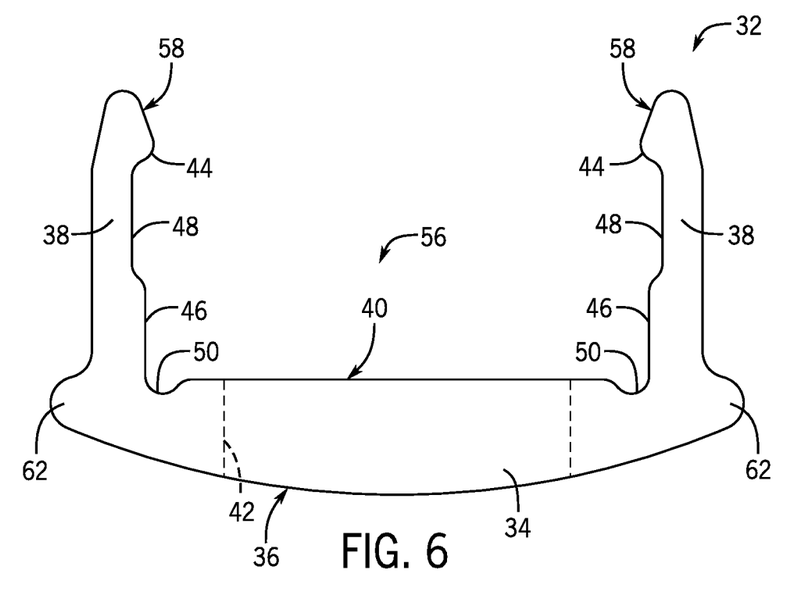
FIG. 6 illustrates a cross-sectional view taken along the line VI-VI in FIG. 5.

As shown in FIGS. 5 and 6, the bolt-retaining strip 32 has a base 34 having a first side 36 configured to be seated against a surface (e.g., the hollow inner surface 37, FIG. 12) of the elongated support member 20 of the fender support arm 16. A pair of arms 38 extend from an opposite second side 40 of the base 34. The base 34 comprises a hole 42 passing therethrough, which hole 42 is configured to receive a shank 60 (see, e.g., FIGS. 7 and 8) of the bolt 24. Each arm 38 in the pair of arms has a lip 44 on an interior surface of the arm 38 that faces and extends toward the opposite arm 38. Each arm 38 in the pair of arms also has a flange 46 located on the surface of the arm 38 that faces toward the opposite arm 38. An indentation 48 on each arm 38 separates each flange 46 from each lip 44. Grooves 50 are formed in the second side 40 of the base 34 proximate each arm 38, below the flanges 46, where each arm 38 meets the base 34.

As shown in FIG. 5, the bolt-retaining strip 32 is elongated in a longitudinal direction L, and the base 34 further comprises additional holes 42 passing therethrough. The holes 42 are spaced in the longitudinal direction L and configured to align with corresponding holes or slots 25 (see, e.g., FIG. 12) in the support member 20 of the fender support arm 16, as well as with corresponding holes 26 (see, e.g., FIGS. 3 and 4) in the fender 14. Although the bolt-retaining strip 32 is shown with three holes 42, fewer or more holes could be provided depending on the design of the support member 20 and the fender 14. Although the holes 42 are shown as being circular, the holes 42 could be ovular, slot-like, or any other shape that allows the shanks 60 of the bolts 24 to pass therethrough. While the cross-sectional shape of the bolt-retaining strip 32 is shown as being uniform in the longitudinal direction L, the arms 38 could be provided only proximate the locations of the holes 42 in some embodiments.

Figure 7:
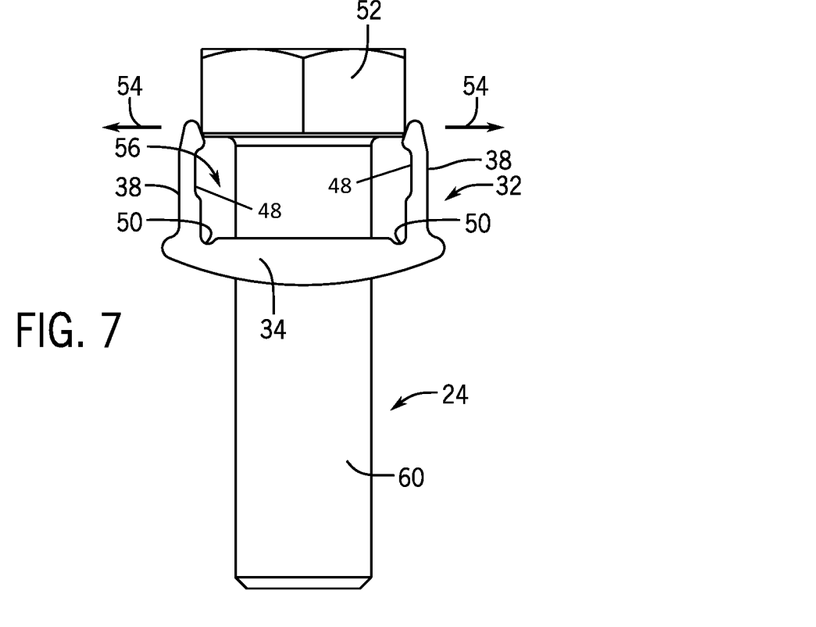
FIG. 7 illustrates a bolt in a first position with respect to the bolt-retaining strip.

FIG. 7 illustrates the bolt 24 as it is being inserted into the bolt-retaining strip 32. Although the lateral dimension between the lips 44 is less than the lateral width of the bolt head 52, arms 38 are configured to allow the head 52 of the bolt 24 to pass therebetween as the bolt 24 is inserted. For example, the bolt-retaining strip 32, or at least the arms 38 thereof, may be formed of a material that is flexible enough to allow the arms 38 to part in the direction of the arrows 54 as the bolt head 52 applies force thereto. Each of the arms 38 includes a leading surface 58 (see, e.g., FIGS. 6 and 8) that tapers laterally inward from a distal end of the arm 38 to the lip 44. The tapered leading surfaces 58 are configured to abut the head 52 of the bolt 24, which acts as a wedge to press the arms 38 open as the bolt head 52 progresses towards the second surface 40 and further into the open area 56 between the arms 38. Once the head 52 of the bolt 24 advances past the lips 44 and the force of the bolt head 52 on the tapered surfaces 58 and/or lips 44 is removed, the arms 38 can then spring/snap back toward one another to return to their original, unflexed positions.

In some embodiments, the grooves 50 may act as living hinges, allowing the arms 38 to part enough to allow the bolt head 52 to enter the open area 56 between the arms 38 of the bolt-retaining strip 32. The force applied to the arms 38 by the bolt head 52 may cause the base 34 of the bolt-retaining strip 32 to flex at the grooves 50, thereby forcing the arms 38 away from each other to accommodate the bolt head 52 between the lips 44. The grooves 50 allow the base 34 of the bolt-retaining strip 32 to flex without permanently deforming so that the base 34 returns to its original form once the force of the bolt head 52 on the arms 38 is removed.

Additionally or alternatively, the indentations 48 may also help the arms 38 flex to allow the bolt head 52 to be inserted between the arms 38, as there is less material in the locations of the indentations 48. The thickness of the arms 38 at the indentations 48 may be selected based on at least one of the desired flexibility of the arms 38 at the indentations 48, the flexibility of other sections of the arms 38, the flexibility of the base 34, the dimensions of the bolt 24 intended to be used with the bolt-retaining strip 32, and any other criteria. For example, the depth of the indentations 48 may be selected so that the arms 38 are 0.045 inches thick at the indentations 48, or so that the arms 38 are more than 0.045 inches or less than 0.045 inches thick at the indentations 48.

Figure 8:
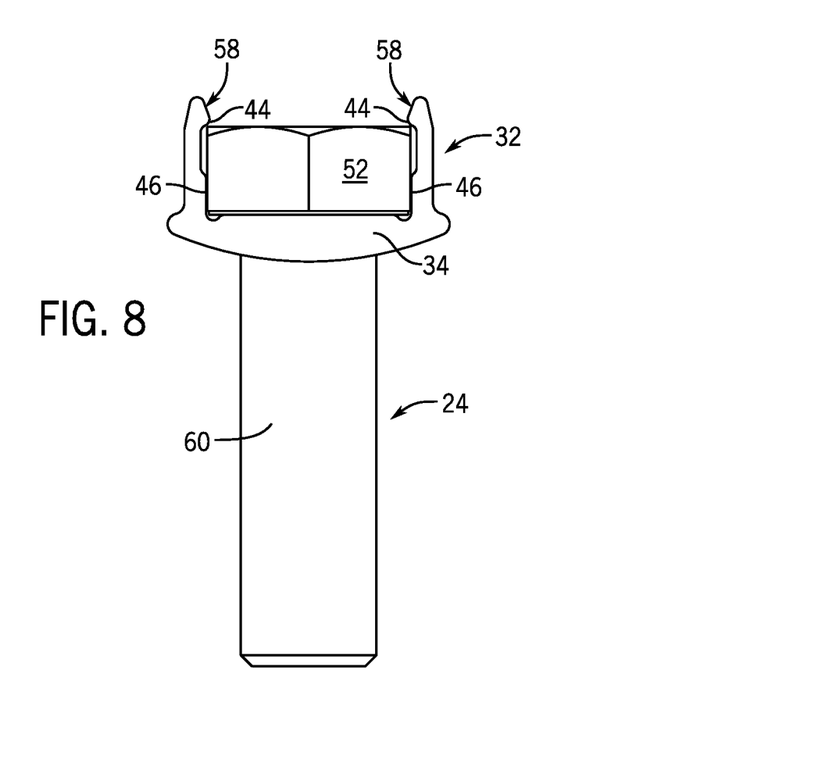
FIG. 8 illustrates the bolt in a second position with respect to the bolt-retaining strip.

As shown in FIG. 8, each lip 44 is configured to extend at least partially over the head 52 of the bolt 24 when the bolt 24 is fully inserted into the hole 42 in the base 34 and the bottom surface of the head 52 contacts the second side 40 of the base 34 that surrounds the hole 42. Abutment between the lower surface of the lips 44 and the bolt head 52 prevents the bolt 24 from falling out of the bolt-retaining strip 32 unless a force is applied to part the arms 38 enough that the lips 44 no longer extend at least partially over the bolt head 52. Thus, the bolt-retaining strip 32 and bolts 24 installed therein can be inserted into the support member 20 as a sub-assembly, without the bolts 24 falling out of the bolt-retaining strip 32.

In some embodiments, the dimensions of the lips 44 may be selected based on at least one of the dimensions of the bolt 24 intended to be used with the bolt-retaining strip 32, a desired overlap over each side of the bolt head, a desired gap between the lips 44, a lateral dimension of the base 34, a flexibility of the arms 38 and/or the base 34, and any other criteria. For example, the lips 44 may be dimensioned to extend 0.012 inches past the faces of the flanges 46 and to leave a 0.545-inch gap between the lips 44 when the arms 38 are in an unflexed state. Some embodiments, however, may include at least one lip 44 that projects less than 0.012 inches or more than 0.012 inches past the surfaces of the corresponding flanges 46. Similarly, some embodiments of a bolt-retaining strip may be dimensioned so that the lateral distance between the opposing lips 44 is less than 0.545 inches or more than 0.545 inches.

The vertical position of the lips 44 relative to the base 34 of the bolt-retaining strip 32 may be altered by adjusting at least one of the length of the arms 38, the position of the lips 44 on the arms 38, the dimensions of the lips 44, and any other dimension adjustable to affect the vertical dimension between the lips 44 and the second side 40 of the base 34. In some embodiments, the vertical dimension between the lips 44 and the second side 40 of the base 34 may be selected based on at least one of the dimensions of a bolt 24 intended to be used with the bolt-retaining strip 32, a desired height of the lips 44, a desired gap between the lip 44 and the second side 40, a flexibility of the arms 38 and/or the base 34, and any other criteria. For example, the lips 44 may be positioned 0.265 inches above the second surface 40 in some embodiments, while other embodiments may include at least one lip 44 that is positioned more than 0.265 inches or less than 0.265 inches away from the second side 40 of the base 34.

As also shown in FIG. 8, the flanges 46 on arms 38 are configured to contact the head of 52 the bolt 24 to prevent rotation thereof with respect to the hole 42 in the base 34 once the bolt 24 is fully inserted into the bolt-retaining strip 32. In other words, as the nut 30 is tightened on the shank 60 of the bolt 24, contact between the bolt head 52 and the flanges 46 prevents rotation of the bolt 24. The flanges 46 may fully contact the flat lateral side surfaces of the bolt head 52 when it is located in this position, or the flanges 46 may contact the bolt head 52 when it rotates slightly as the nut 30 is tightened, due to the lateral dimension of the bolt head 52 in such a slightly rotated position being greater than the dimension between the flanges 46. Thus, while the flanges 46 may be spaced specifically to accommodate a particular size of bolt head, the bolt-retaining strip 32 could be used with bolts having heads of slightly smaller sizes as well, as long as the widest lateral dimension of the head 52 is greater than that between the flanges 46.

In some embodiments, the lateral dimension between the opposing flanges 46 may be selected based on at least one of the dimensions of a bolt 24 intended to be used with the bolt-retaining strip 32, a desired gap between the flanges 46, the thickness of each flange 46, a lateral dimension of the base 34, and any other criteria. For example, the flanges 46 may be dimensioned so that the lateral distance between the flanges 46 is 0.569 inches in some embodiments, while other embodiments may include flanges 46 that are separated by a lateral dimension that is more than 0.569 inches or less than 0.569 inches.

Figure 12:
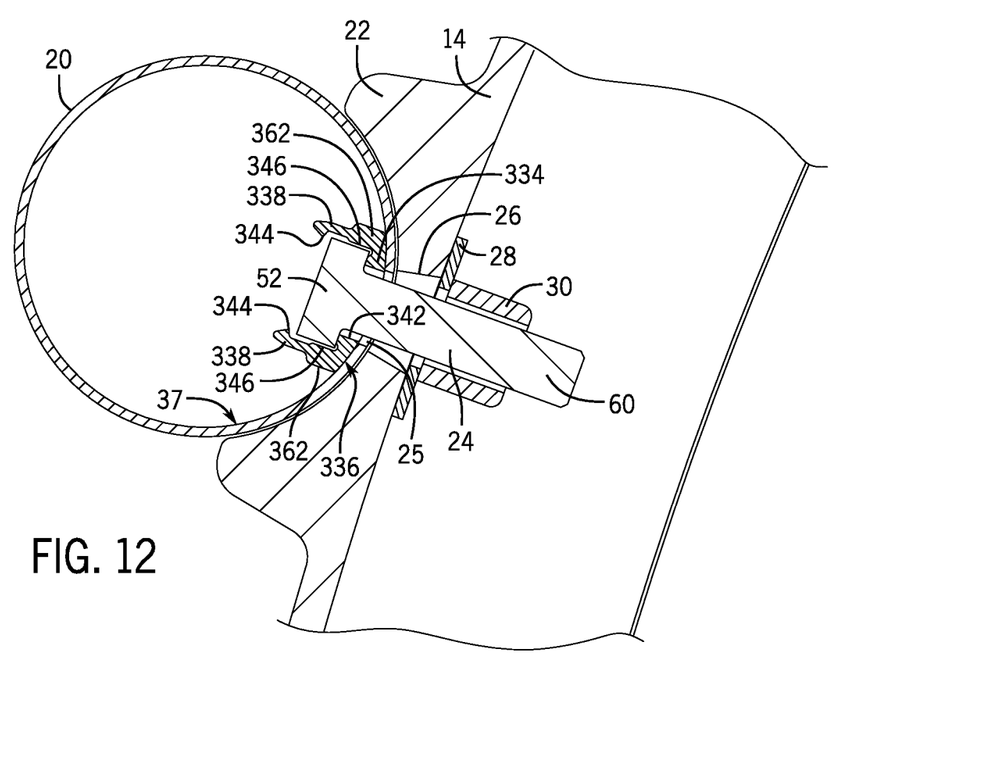
FIG. 12 illustrates a cross-sectional view of the bolt retaining strip of FIG. 11 with a bolt securing a fender to an elongated support member.

Referring also to FIG. 12, the rounded first side 36 of the bolt-retaining strip 32 is configured to rest against the rounded inner surface 37 of the tubular support member 20 after the bolts 24 (pre-assembled to the bolt-retaining strip 32) are inserted into respective holes 25 in the support member 20. The bolt-retaining strip 32 may include exterior flanges 62 that extend laterally outward from opposite sides of the base 34. The flanges 62 (see, e.g., FIG. 6) may help locate the bolt-retaining strip 32 in the rounded inner surface 37 of the tubular support member 20. The first side 36 of the bolt-retaining strip 32 is curved in a convex arc between opposite lateral sides of the bolt-retaining strip 32. The convex first side 36 is configured to be seated against the concave inner surface 37 of the support member 20.

In the illustrated embodiments, the radius of the curvature of the first side 36 is substantially the same as the radius of the curvature of the inner surface 37 of the support member 20 so that the first side 36 may be flush against the inner surface 37. Some embodiments of a bolt-retaining strip, however, may include a first side 36 with a different curvature that the inner surface 37 of the support member 20. For example, the radius of the convex first side 36 of the bolt retaining strip 32 may be smaller than the radius of the concave inner surface 37 of the support member 20 so that only a portion of the first side 36 contacts the inner surface 37. Alternatively, the radius of the first side 36 of the bolt retaining strip 32 may be larger than the radius of the inner surface 37 of the support member 20. In such an embodiment, contact between the flanges 62 and the inner surface 37 of the support member 20 may cause the base 34 to flex at the grooves 50 so that the first side 36 conforms to the curvature of the inner surface 37. As the base 34 flexes, the arms 38 may move towards each other and the distance between the flanges 46 may decrease. This may be useful, for example, so that the flanges 46 may prevent the rotation of bolts 24 having small bolt heads 52.

To attach the support member 20 to the fender 14, the shanks 60 of bolts 24 are inserted into the holes 42 in the bolt-retaining strip 32, and the bolts 24 are either pressed or pulled through the holes 42 until the heads 52 thereof snap into place between the flanges 46 and below the lips 44. The bolt-retaining strip 32 is then inserted into the passageway 21 extending through the support member 20 from one of its open ends, until the bolts 24 line up with holes 25 in the support member 20. The bolts 24 are then inserted through the holes 25 in the support member 20 by pressing on the bolt-retaining strip 32 until the first side 36 of the bolt-retaining strip 32 rests against the inner surface 37 of the support member 20. The bolts 24 are then aligned with the holes 26 in the fender 14, and the support member 20 is placed in the cradle 22. The washers 28 and nuts 30 are placed over the ends of the bolts 24 that protrude from the opposite side of the fender 14, and the nuts 30 are tightened appropriately. As noted herein above, the flanges 46 abut the bolt heads 52 and prevent the bolts 24 from turning, thereby allowing the nuts 30 to be tightened. The curved shape of the first side 36 of the base 34 and the extra dimension due to the flanges 62 act to spread the force from tightening the nuts 30 out over the inner surface 37 of the support member 20, to prevent the bolt-retaining strip 32 and the support member 20 from cracking.

Figure 9:
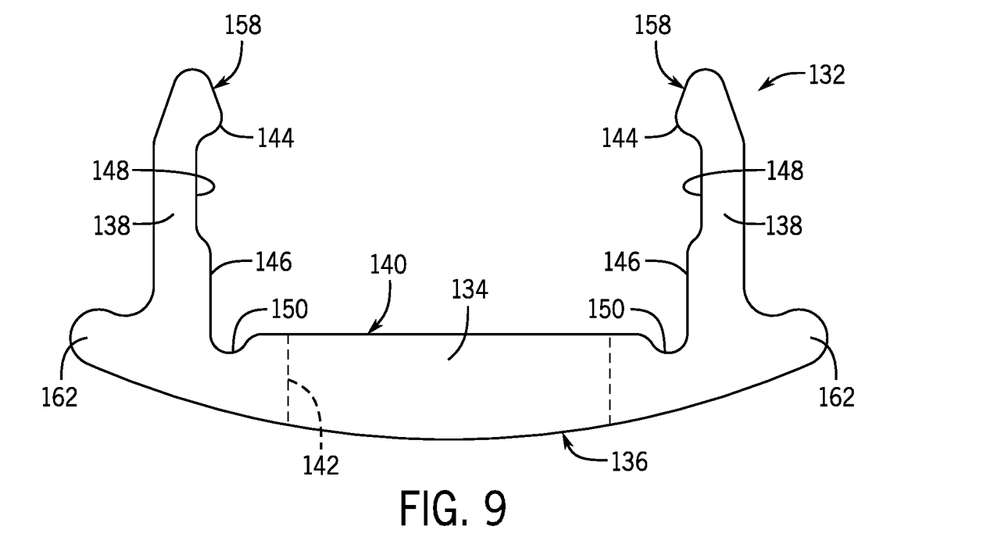
FIG. 9 illustrates a cross-sectional view of an alternative bolt-retaining strip.

FIG. 9 shows a cross-section of another embodiment of a bolt-retaining strip 132 according to the present disclosure. Like the bolt-retaining strip 32 of FIGS. 3-8, the bolt-retaining strip 132 is elongated in a longitudinal direction (into and out of the page) and has at least one hole 142 extending through its base 134 configured to receive the shank 60 of at least one bolt 24. The base 134 has a first side 136 configured to be seated against a surface (e.g., the inner surface 37) of the elongated support member 20 of the fender support arm 16. A pair of arms 138 extend from an opposite second side 140 of the base 134. Each arm 138 in the pair of arms has a lip 144 on a surface of the arm 138 that faces toward the opposite arm 138. Each arm 138 in the pair of arms also has a flange 146 located on the surface of the arm 138 that faces toward the opposite arm 138. Each lip 144 is configured to extend at least partially over the head 52 of the bolt 24 when the bolt 24 is fully inserted into the hole 142 in the base 134. The flanges 146 on arms 138 are configured to contact the head of 52 the bolt 24 to prevent rotation thereof with respect to the hole 142 in the base 134 once the bolt 24 is fully inserted into the bolt-retaining strip 132.

The bolt-retaining strip 132 of FIG. 9 is nearly identical to the bolt-retaining strip 32 of FIGS. 3-8, except exterior flanges 162 on either side of the base 134 are more pronounced. This bolt-retaining strip 132 could therefore be made of a more flexible material than the bolt-retaining strip 32 and used in the same support member 20 or could be used in a support member having a different cross-sectional size and/or shape. Other labeled parts of the bolt-retaining strip 132 not specifically described herein function in the same way as those noted herein above with respect to the bolt-retaining strip 32, but are labeled with a "1" before the corresponding reference numeral (e.g., the part 150 is a groove that functions like groove 50).

Figure 10:
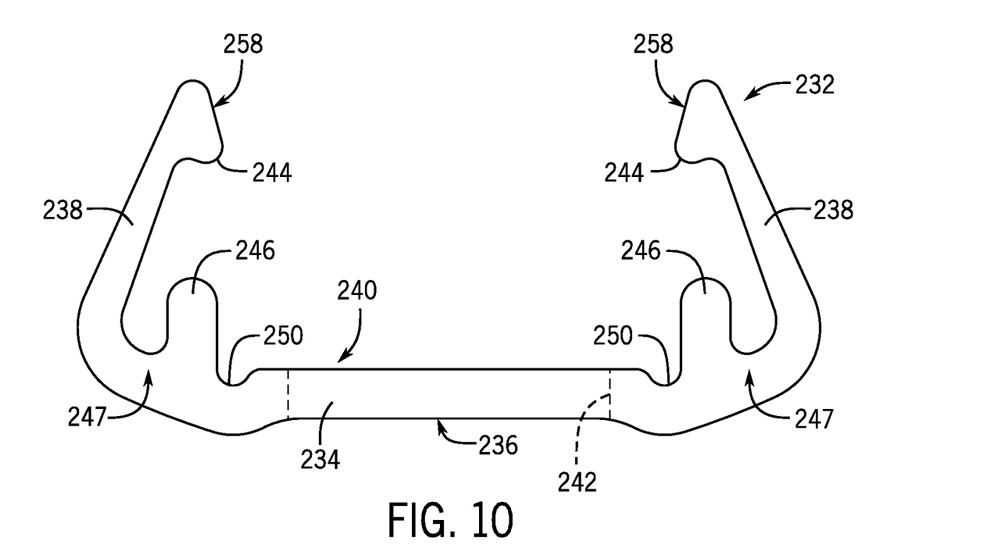
FIG. 10 illustrates a cross-sectional view of another alternative bolt-retaining strip.

FIG. 10 shows a cross-section of yet another embodiment of a bolt-retaining strip 232 according to the present disclosure. Like the bolt-retaining strips 32, 132 of FIGS. 3-9, the bolt-retaining strip 232 is elongated in a longitudinal direction (into and out of the page) and has at least one hole 242 extending through its base 234 configured to receive the shank 60 of at least one bolt 24. The base 234 has a first side 236 configured to be seated against a surface (e.g., the inner surface 37) of the elongated support member 20 of the fender support arm 16. A pair of arms 238 extend from an opposite second side 240 of the base 234. Each arm 238 in the pair of arms has a lip 244 on a surface of the arm 238 that faces toward the opposite arm 238. Each arm 238 in the pair of arms also has a flange 246 located inwardly of the surface of the arm 238 that faces the other arm 238. More specifically, while the flanges 46, 146 of the first two embodiments were located on the facing surfaces of the arms 38, 138, the flanges 246 extend upwardly from a location 247 proximate where the arm 238 meets the base 234. Each lip 244 is configured to extend at least partially over the head 52 of the bolt 24 when the bolt 24 is fully inserted into the hole 242 in the base 234. The flanges 246 are configured to contact the head of 52 the bolt 24 to prevent rotation thereof with respect to the hole 242 in the base 234 once the bolt 24 is fully inserted into the bolt-retaining strip 232.

Note that the base 234 of the bolt-retaining strip 232 of FIG. 10 is shaped differently than the base 34, 134 of the first two embodiments. Thus, the bolt-retaining strip 232 could be used with a support member having a different cross-sectional shape. Alternatively, the bolt-retaining strip 232 could be used with the support member 20 of FIGS. 3 and 4, but could be made of a material that is flexible enough to bend and conform to the inner shape of the support member 20 as the nut 30 is tightened on the shank 60 of the bolt 24. Other labeled parts of the bolt-retaining strip 232 not specifically described herein function in the same way as those noted herein above with respect to the bolt-retaining strip 32, but are labeled with a "2" before the corresponding reference numeral (e.g., the part 250 is a groove that functions like groove 50).

Figure 11:
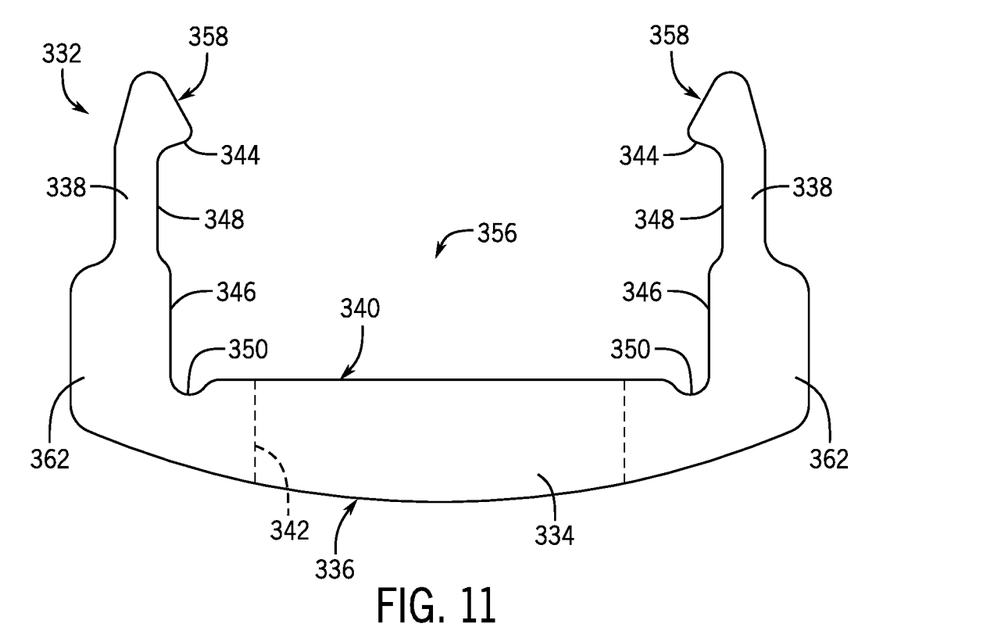
FIG. 11 illustrates a cross-sectional view of another alternative bolt-retaining strip.

FIG. 11 shows a cross-section of yet another embodiment of a bolt-retaining strip 332 according to the present disclosure. Like the bolt-retaining strips 32, 132, 232 of FIGS. 3-10, the bolt-retaining strip 332 is elongated in a longitudinal direction (into and out of the page) and has at least one hole 342 extending through its base 334 configured to receive the shank 60 of at least one bolt 24. The base 334 has a first side 336 configured to be seated against a surface (e.g., the inner surface 37) of the elongated support member 20 of the fender support arm 16. A pair of arms 338 extend from an opposite second side 340 of the base 334. Each arm 338 in the pair of arms has a lip 344 on a surface of the arm 338 that faces toward the opposite arm 338. Each arm 338 in the pair of arms also has a flange 346 located on the surface of the arm 338 that extends laterally toward the opposite arm 338. Each lip 344 is configured to extend at least partially over the head 52 of the bolt 24 when the bolt 24 is fully inserted into the hole 342 in the base 334 to retain the bolt 24 therein. The flanges 346 on arms 338 are configured to contact the head of 52 the bolt 24 to prevent rotation thereof with respect to the hole 342 in the base 334 once the bolt 24 is fully inserted into the bolt-retaining strip 332.

The bolt-retaining strip 332 of FIG. 11 is generally similar to the bolt-retaining strip 32 of FIGS. 3-8, except the exterior flanges 362 on either side of the base 334 extend further vertically upward and are integrally formed with the arms 338. The thickness of the arm 338 is therefore increased between the second side 340 of the base 334 and the indentations 348 on the arms 338. This may increase the strength and durability of the arms 338 to prevent damage as the bolt 24 is inserted or as the nut 30 is tightened on the bolt 24. The increased thickness of the arms 338 may also reduce the flexibility of the arm 338 along the thickened section. As a result, the bolt-retaining strip 332 may flex more at the indentations 348 on the arms 338 and/or the grooves 350 in the base 334 as the bolt 24 is inserted into the bolt retaining strip 332.

In some embodiments, the thickness of the exterior flanges 362 may be selected based on at least one of the desired flexibility of the arms 338, the desired thickness of the arms 338, the expected force exerted by the bolt head 52 on the arms 338 as the nut 30 is tightened on the bolt 24, and any other criteria. For example, each of the exterior flanges 362 may extend 0.045 inches past the outer surface of the arms 338 so that each arm 338 is 0.1105 inches thick between surfaces of the exterior flanges 362 and the interior flanges 346. Some embodiments, however, may include at least one exterior flange 362 that extends more or less than 0.045 inches past the outer surface of the arms 338 such that at least one of the arms is more or less than 0.1105 inches thick between the exterior flanges 362 and the interior flanges 346.

Other labeled parts of the bolt-retaining strip 332 not specifically described herein function in the same way as those noted herein above with respect to the bolt-retaining strip 32, but are labeled with a "3" before the corresponding reference numeral (e.g., the part 350 is a groove that functions like groove 50).

FIG. 12 shows a cross-section of the bolt-retaining strip 332 shown in FIG. 11 in use to secure a fender 14 to the support member 20 of the fender support arm 16. In the illustrated embodiment, the head 52 of the bolt 24 is received within the open area 356 between the two arms 338 and retained therein by the lips 344 of the arms 338. The first side 336 of the bolt-retaining strip 332 sits flush against the inner surface 37 of the support arm 20, and the support arm 20 is received in the cradle 22 of the fender 14 with the holes 342 formed in the bolt-retaining strip 332 in alignment with corresponding holes 25, 26 formed in the support member 20 and the fender 14, respectively. The shank 60 of the bolt 24 extends through each set of corresponding holes 42, 25, 26, and a washer 28 and a nut 30 are received by the shank 60 on the back side of the fender 14 to clamp the bolt-retaining strip 332, the support member 20, and the fender 14 together between the head 52 of the bolt 24 and the washer 28. Although a small gap is left between the flanges 346 and the flat sides of the bolt head 52, the flanges 346 restrict rotation of the bolt 24 as the nut 30 is secured thereto as the distance between the flanges 346 is less than the maximum width of the bolt head 52, which contacts the flanges 346 after initially rotating slightly as the nut 30 is secured.

Although FIG. 12 depicts a fender 14 that is secured to the tubular support member 20 using the bolt-retaining strip 332 shown in FIG. 11, it should be appreciated that the bolt-retaining strips 32, 132, 232 of FIGS. 1-12 may also be used to couple the fender 14 to the support member 20 in a similar manner.

The bolt-retaining strips 32, 132, 232, 332 could be made of plastic, an elastomer, or metal, such as aluminum or an alloy thereof. In some examples, the bolt-retaining strips 32, 132, 232, 332 are made of a single material and are formed by extrusion. In other examples, portions of the bolt-retaining strips 32, 132, 232, 332 are formed of a different material than the remainder, such as by co-extrusion. For example, the arms 38, 138, 238, 338 might be made of a more flexible material than the base 34, 134, 234, 334, or vice versa, depending on the application. In other examples, the "joints" between the arms 38, 138, 238, 338 and the base 34, 134, 234, 334 may be made of a more flexible material than the arms 38, 138, 238, 338 and the base 34, 134, 234, 334, which can be made of the same material.

Although the bolts 24 shown herein are hex bolts, it is possible to use the present bolt-retaining strips 32, 132, 232, 332 with hex flange bolts, square head bolts, or any other known type of bolt having a head with at least one laterally outwardly facing flat surface that can be contacted by the flanges 46, 146, 246, 346 in the bolt-retaining strips 32, 132, 232, 332 to prevent the bolt from turning.

While the bolt-retaining strips 32, 132, 232, 332 of FIGS. 1-12 are generally symmetrical such that left and right sides of the bolt-retaining strips 32, 132, 232, 332 are the same, some embodiments of a bolt-retaining strip may include at least one asymmetrical feature. For example, a bolt-retaining strip may include an arm with a lip, a tapered leading surface, a flange, an indentation, and/or any other dimension or feature that is differently shaped and/or sized than a corresponding feature on the opposite arm. Additionally or alternatively, although the illustrated bolt-retaining strips 32, 132, 232, 332 have consistent dimensions along the longitudinal length of the bolt-retaining strips 32, 132, 232, 332, some embodiments may include at least one feature that changes in shape, size, or orientation along at least a portion of the longitudinal length of the bolt-retaining strip. Further still, a bolt-retaining strip may be configured with only a single arm (i.e., with one arm omitted) along at least a portion of the longitudinal length of the bolt-retaining strip.

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims.

What is claimed is:

1. A bolt-retaining strip for a fender support arm, the bolt retaining strip comprising:
 a base including a first surface configured to be seated against a surface of an elongated support member of the fender support arm and a second surface opposite the first surface;
 a hole extending from the first surface of the base to the second surface, the hole being dimensioned to receive a shank of a bolt;
 a first arm and a second arm positioned on opposite lateral sides of the hole and projecting outward from the second surface of the base, the first and second arms being spaced apart so that a head of the bolt can be received between the first arm and the second arm;
 a lip extending from a respective interior surface of each of the first and second arms towards the opposite one of the first and second arms, each of the lips being dimensioned to extend over a portion of the head of the bolt; and
 a flange extending upwards from the second surface proximate each of the first arm and the second arm, respectively, each of the flanges being configured to restrict rotation of the bolt relative to the hole.

2. The bolt-retaining strip of claim 1, wherein the base is elongated in a longitudinal direction, and the base further comprises additional holes passing therethrough, the holes being spaced in the longitudinal direction.

3. The bolt-retaining strip of claim 2, further comprising grooves formed in the second surface of the base proximate the flanges, the grooves extending along the base in the longitudinal direction.

4. The bolt-retaining strip of claim 1, wherein each of the flanges is integrally formed in the interior surface of the first arm or the second arm.

5. The bolt-retaining strip of claim 4, further comprising an indentation formed in the interior surface of each of the first arm and the second arm between the lips and the flanges.

6. The bolt-retaining strip of claim 1, further comprising exterior flanges extending laterally outward from opposite sides of the base.

7. The bolt retaining strip of claim 6, wherein each of the exterior flanges is integrally formed with one of the first or second arms and extends upward from the second surface of the base.

8. The bolt-retaining strip of claim 1, wherein the first arm and the second arm each include a tapered surface that tapers laterally inward from a distal end of the respective first or second arm to the respective lip.

9. The bolt-retaining strip of claim 1, wherein the first surface of the base is curved in a convex arc between opposite lateral sides of the base.

10. The bolt-retaining strip of claim 9, wherein the surface of the elongated support member is curved in a concave arc such that the first surface of the base is configured to be nested within the concave arc; and
 wherein the convex arc of the first surface of the base has a first radius that is larger than a second radius of the concave arc of the elongated support member.

11. A fender support arm for securing a fender to a truck, the fender support arm comprising:
 an elongated support member including a passageway extending from a first end to a second end and configured to engage a mounting feature positioned on the truck to secure the elongated support member to the truck;
 a bolt-retaining strip configured to be received within the passageway of the elongated support member, the bolt-retaining strip comprising a base with a first side configured to be seated against an interior surface of the elongated support member and a pair of arms extending from an opposite second side of the base, the pair of arms configured to allow a head of a bolt to pass therebetween;
 wherein each arm in the pair of arms includes a lip that extends inward towards the opposite one of the arms, the lips being configured to retain the head of the bolt between the pair of arms;
 wherein each arm in the pair of arms includes a flange configured to contact the head of the bolt to prevent rotation thereof; and wherein the base of the bolt-retaining strip and the elongated support member each include a hole configured to receive a shank of the bolt such that the shank extends through the base and the elongated support member to engage an opening on the fender to secure the fender to the truck.

12. The fender support arm of claim 11, wherein the elongated support member is configured to be received in a mounting cradle on the fender.

13. The fender support arm of claim 11, wherein the bolt-retaining strip is elongated in a longitudinal direction, and the base further comprises additional holes passing therethrough, the holes being spaced in the longitudinal direction and configured to align with corresponding holes in the elongated support member and corresponding openings on the fender.

14. The fender support arm of claim 11, wherein the lips of the arms are configured to extend over the head of the bolt to restrict movement of the bolt relative to the base of the bolt-retaining strip.

15. The fender support arm of claim 11, wherein the bolt-retaining strip further comprises a pair of grooves formed in the second side of the base, each of the grooves being positioned between one of the arms and the hole formed through the base; and wherein the grooves are configured to allow the base of the bolt-retaining strip to flex so that the first side thereof conforms to the interior surface of the elongated support member.

16. The fender support arm of claim 15, wherein the grooves are configured to allow the bolt-retaining strip to flex such that the each of the arms pivots outward to allow the head of the bolt to travel past the lips.

17. The fender support arm of claim 11, wherein the pair of arms are configured to flex outward as the bolt is received therebetween so that the head of the bolt can travel past the lips.

18. The fender support arm of claim 17, wherein each arm in the pair of arms includes a tapered leading surface positioned between the lip and a distal end of the respective arm, each of the tapered leading surfaces being configured to abut the head of the bolt as it travels towards the base to bias the pair of arms outward.

19. A bolt-retaining strip for a fender support arm, the bolt-retaining strip comprising:

a base having a first side configured to be seated against a surface of an elongated support member of the fender support arm; and a pair of arms extending from an opposite second side of the base and configured to allow a head of a bolt to pass therebetween;

wherein the base comprises a hole passing therethrough, the hole being configured to receive a shank of the bolt;

wherein each arm in the pair of arms has a lip on a surface of the arm that faces toward the opposite arm, each lip being configured to extend at least partially over the head of the bolt when the bolt is fully inserted into the hole in the base; and wherein each arm in the pair of arms has a flange located on or inwardly of the surface of the arm that faces toward the opposite arm, the flange being located between the base and the lip and configured to contact the head of the bolt to prevent rotation thereof with respect to the hole in the base.

20. The bolt-retaining strip of claim 19, wherein the bolt-retaining strip is elongated in a longitudinal direction, and the base further comprises additional holes passing therethrough, the holes being spaced in the longitudinal direction and configured to align with corresponding holes in the elongated support member.

\* \* \* \* \*